US006892173B1

(12) United States Patent
Gaither et al.

(10) Patent No.: US 6,892,173 B1
(45) Date of Patent: May 10, 2005

(54) ANALYZING EFFECTIVENESS OF A COMPUTER CACHE BY ESTIMATING A HIT RATE BASED ON APPLYING A SUBSET OF REAL-TIME ADDRESSES TO A MODEL OF THE CACHE

(75) Inventors: Blaine D. Gaither, Fort Collins, CO (US); Robert B. Smith, Lindon, UT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 626 days.

(21) Appl. No.: 09/052,358

(22) Filed: Mar. 30, 1998

(51) Int. Cl.[7] .......................... G06F 12/00; G06F 9/455

(52) U.S. Cl. ............................ 703/20; 703/21; 703/22; 711/118; 711/137; 711/158; 711/204; 714/47

(58) Field of Search ................................ 711/133, 159, 711/118, 137, 158, 204, 213; 714/47, 42, 718; 703/13, 14, 17, 21, 22, 23

(56) References Cited

U.S. PATENT DOCUMENTS

| | | | | | |
|---|---|---|---|---|---|
| 4,142,234 | A | * | 2/1979 | Bean et al. | 711/144 |
| 5,379,393 | A | * | 1/1995 | Yang | 711/3 |
| 5,392,408 | A | * | 2/1995 | Fitch | 711/202 |
| 5,452,440 | A | * | 9/1995 | Salsburg | 711/136 |
| 5,497,458 | A | * | 3/1996 | Finch et al. | 365/201 |
| 5,615,357 | A | * | 3/1997 | Ball | 703/21 |
| 5,619,676 | A | * | 4/1997 | Fukuda et al. | 711/128 |
| 5,640,509 | A | * | 6/1997 | Balmer et al. | 714/42 |
| 5,651,112 | A | * | 7/1997 | Matsuno et al. | 714/47 |

(Continued)

OTHER PUBLICATIONS

A. Agarwal , J. Hennessy , M. Horowitz, An analytical cache model, ACM Transactions on Computer Systems (TOCS), May 1989, vol. 7 Issue 2, pp.: 184–215.*

A. Agarwal , R. L. Sites , M. Horowitz, ATUM: a new technique for capturing address traces using microcode, ACM SIGARCH Computer Architecture News, v.14 n.2, p. 119–127, Jun. 1986.*

S. J. Eggers, E. D. Lazowska, Y. B. Lin, Techniques for the trace–driven simulation of cache performance, Proceedings of the 21st conference on Winter simulation, Oct. 1989, pp.: 1042–1046.*

IBM Technical Disclosure Bulletin, Scheme for Producing Miss–Rate As a Function of Cache Size by Means of Traces Produced by Observing Missed From a Cache Of Fixed Size, Apr. 1991, vol.: 33, Issue: 11 p.: 36–39.*

Tien–Fu Chen, Efficient trace□sampling simulation techniques for cache performance analysis, Simulation Symposium, 1996., Proceedings of the 29th Annual , 1996, pp 54–63.*

*Primary Examiner*—Hong Kim
(74) *Attorney, Agent, or Firm*—Augustus W. Winfield

(57) ABSTRACT

A system and method for analyzing the effectiveness of a computer cache memory. A bus with memory transactions is monitored. A subset of addresses, along with associated transaction data, on the bus is captured and stored in a memory. The captured addresses are applied to a software model of a computer cache. The capture process is repeated multiple times, each time with a different subset of the address space. Statistical estimates of hit rate and other parameters of interest are computed based on the software model. Multiple cache configurations may be modeled for comparison of performance. Alternatively, a subset of addresses along with associated transaction data is sent to a hardware model of a cache. The contents of the hardware model are periodically dumped to memory or statistical data may be computed and placed in the memory. Statistical estimates of hit rate and other parameters of interest are computed based on the contents of the memory.

10 Claims, 3 Drawing Sheets

U.S. PATENT DOCUMENTS 5,675,729 A * 10/1997 Mehring ...................... 714/37
5,680,544 A * 10/1997 Edmondson et al. ......... 714/42
5,704,053 A * 12/1997 Santhanam ................. 712/207
5,781,721 A * 7/1998 Hayes et al. .................. 714/42
5,793,374 A * 8/1998 Guenter et al. ............. 345/426
5,805,863 A * 9/1998 Chang ......................... 703/22
5,819,105 A * 10/1998 Moriarty et al. ............... 710/5
5,862,371 A * 1/1999 Levine et al. ............... 712/228
5,920,892 A * 7/1999 Nguyen ...................... 711/146
5,940,618 A * 8/1999 Blandy et al. ................. 717/4
5,960,457 A * 9/1999 Skrovan et al. ............. 711/146
5,999,721 A * 12/1999 Colglazier ................... 703/20
6,003,142 A * 12/1999 Mori ........................... 714/30
6,047,359 A * 4/2000 Fouts ......................... 711/137
6,049,847 A * 4/2000 Vogt et al. .................. 710/130
6,059,835 A * 5/2000 Bose ........................... 703/19
6,129,458 A * 10/2000 Waters et al. ............... 711/133
6,226,738 B1 * 5/2001 Dowling ..................... 712/223

* cited by examiner

ANALYZING EFFECTIVENESS OF A COMPUTER CACHE BY ESTIMATING A HIT RATE BASED ON APPLYING A SUBSET OF REAL-TIME ADDRESSES TO A MODEL OF THE CACHE

FIELD OF INVENTION

This invention relates generally to digital computer memory systems and more specifically to estimating the hit rate in large cache memory systems.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a relatively small fast memory called a cache, either physically integrated within a processor integrated circuit or mounted physically close to the processor speed. There may be separate instruction caches and data caches. There may be multiple levels of caches. While the present patent document is applicable to any cache memory system, the document is particularly applicable to large caches, for example a cache for a multiprocessor systems having at least two levels of cache with the largest caches having a capacity of at least tens of megabytes.

The goal of a memory hierarchy is to reduce the average memory access time. A memory hierarchy is cost effective only if a high percentage of items requested from memory are present in the highest levels of the hierarchy (the levels with the shortest latency) when requested. If a processor requests an item from a cache and the item is present in the cache, the event is called a cache hit. If a processor requests an item from a cache and the item is not present in the cache, the event is called a cache miss. In the event of a cache miss, the requested item is retrieved from a lower level (longer latency) of the memory hierarchy. This may have a significant impact on performance.

Ideally, an item is placed in the cache only if it is likely to be referenced again soon. Items having this property are said to have locality. Items having little or no reuse "pollute" a cache and ideally should never be placed in a cache. There are two types of locality, temporal and spatial. Temporal locality means that once an item is referenced, the very same item is likely to be referenced again soon. Spatial locality means that items having addresses near the address of a recently referenced item are likely to be referenced soon. For example, sequential data streams and sequential instruction streams typically have high spatial locality and little temporal locality. Since data streams often have a mixture of temporal and spatial locality, performance may be reduced because sections of the data stream that are inherently random or sequential can flush items out of the cache that are better candidates for long term reference. Typically, the minimum amount of memory that can be transferred between a cache and a next lower level of the memory hierarchy is called a line, or sometimes a block or page. Typically, spatial locality is accommodated by increasing the size of the unit of transfer (line, block, page). In addition, if a data stream is sequential in nature, prefetching can also be used. There are practical limits to the size of cache lines, and prefetching can flush lines that may soon be reused from the cache.

A large cache or a particular cache configuration may or may not be cost effective. In general, cache memory systems are expensive. In addition to the basic memory involved (which is usually the fastest, most expensive memory available), an extensive amount of overhead logic is required for determining whether there is a cache hit. For multiprocessor systems, additional overhead logic is required to ensure that every copy of a particular memory location within multiple cache memories is consistent (called cache coherency). For a large cache, the associated overhead logic may add delay. Finally, there is the issue of locality. Cache systems optimized for one type of locality may impede the performance of application software having a different locality. In general, a determination of whether it is cost effective to increase the size of an existing cache or whether it is cost effective to provide an additional cache is dependent on the particular application software.

A common problem in system design is to evaluate the cost/performance of alternative large cache architectures. For cost effectiveness, there is a need to ship systems having a minimal cost and then have the capability to evaluate the systems while running the customer's application software to see if additional cache memory would be cost effective. This involves more than just measuring miss rate or software execution time. Once a cache is full, a new item evicts an existing item, and the existing item may or may not be needed in the future. An artifact of this eviction may be additional bus traffic on memory busses to cast out or write back modified lines. If a cache is inclusive of all caches higher in the hierarchy, a cache line invalidate transaction may need to be sent to higher level caches to maintain inclusion. There is a need to monitor which items evict other items from the cache, and a need to monitor whether evicted items are later returned to the cache, and a need to evaluate locality and a need to evaluate alternative replacement algorithms.

The time an item remains in the cache is called the residency time. Ideally, all activity for a cache should be captured in real time continuously for a time period that is several times as long as the average residency time of items in the cache, and preferably for a much longer time in order to monitor items having longer than average residency. However, in large systems, this may require capturing and recording-tens of billions of transactions. In addition, for multiprocessor systems, there may be several caches that need to be monitored simultaneously. Typical logic analyzers capable of capturing bus transactions in real time can only store a few million contiguous transactions. As a result, it is impractical to capture all the activity in real time for the average residency time for a large cache. Historically, there have been three approaches to evaluating the effectiveness of a cache without having to capture all the data in real time for the average residency time, as follows:

1. Periodic Trace (Also Called Trace Stitching)

All activity for a cache may be captured in real time until the buffer for the capture system is full. The capture system then stops capturing bus activity but the computer system continues while the capture buffer is recorded. No activity is captured during transfer of the captured data. After the captured data is written out, the capture system again monitors activity in real time. Even though many separate traces may be taken and "stitched" together to make a longer trace, periodic traces miss many events of interest.

2. Periodic System Halt

All activity for a cache may be captured in real time until the buffer of the capture system is full. The system is then halted (system clock stopped) while the capture system buffer is recorded for later evaluation. Halting a pipelined computer system periodically is often impractical, particularly for systems with dynamic logic and particularly if there are time-dependent software functions or extensive input/output (I/O) activity. For example, all pending I/O activity at the time the system is halted is suddenly completed when the system is restarted. As a result, artifacts resulting from testing change the behavior of the system under test.

3. Simulation

A computer system may be simulated. Cache traces may be generated as an output of the simulator. This is common during computer development, but simulators are very expensive and typically simulation cannot be performed at a customer's site running the customer's actual software workload.

There is a need for a low cost system and method for determining the effectiveness of a cache over a long period of time while continuously running a customer's actual software workload.

SUMMARY OF THE INVENTION

Instead of capturing all activity for a short period of time, a system in accordance with the invention captures references to a relatively small portion of the address space (chosen to map entirely to a group of sets of a proposed cache), continuously, in real time, over a relatively long period of time. The test is repeated many times, each time with a different subset of the address space. The system then applies the captured information to a software model of a proposed cache. Then, population statistics are used to estimate and characterize various parameters of interest. It is not necessary to capture transactions over the entire address space. By observing the behaviors of a few groups of cache sets, and the use of statistics, inferences may be drawn about all the sets of the proposed cache. Total monitoring time may be traded off with statistical confidence limits.

A programmable hashing algorithm may be used to partition the address bits available so that a small subset of the address space is captured. The hashing algorithm (or address mask or filter) is chosen so that it captures all the transactions for a particular group of cache sets and excludes all other cache sets. Stated alternatively, the subset is chosen such that it maps exactly onto one or more sets of a proposed cache and no other sets of the proposed cache. A transaction is sampled only when an address within the particular subset is referenced. Trace records are written to a memory for subsequent analysis. Statistical data (references to the subset, hit and miss rates, evictions, etc.) is computed using the captured transactions and a cache model. A single set of captured transactions may be applied to multiple cache configuration models to determine the most effective configuration.

Hardware for monitoring may be an external logic analyzer. Alternatively, monitoring hardware may be incorporated into computer hardware external to a processor. Alternatively, appropriate hardware may be embedded within an integrated processor. For a bus-based system, the hardware may monitor all transactions on a bus. For a ring-based system or cross-bar system, the hardware may monitor a processor-to-interconnect interface or an interconnect-to-memory interface.

As an alternative, rather than recording an activity trace directly to memory, a hardware model of part of a cache may be implemented at the measurement point. Model statistics for this hardware model are periodically recorded (or analyzed dynamically without separate recording) and the mask is periodically changed so that the hardware model receives references to a different group of sets. The statistical data for multiple observation periods is combined and statistical inferences are drawn on the overall set of observations to provide a conclusion about the overall proposed cache.

DETAILED DESCRIPTION OF THE PREFERRED EMBODIMENT OF THE INVENTION

Figure 1:
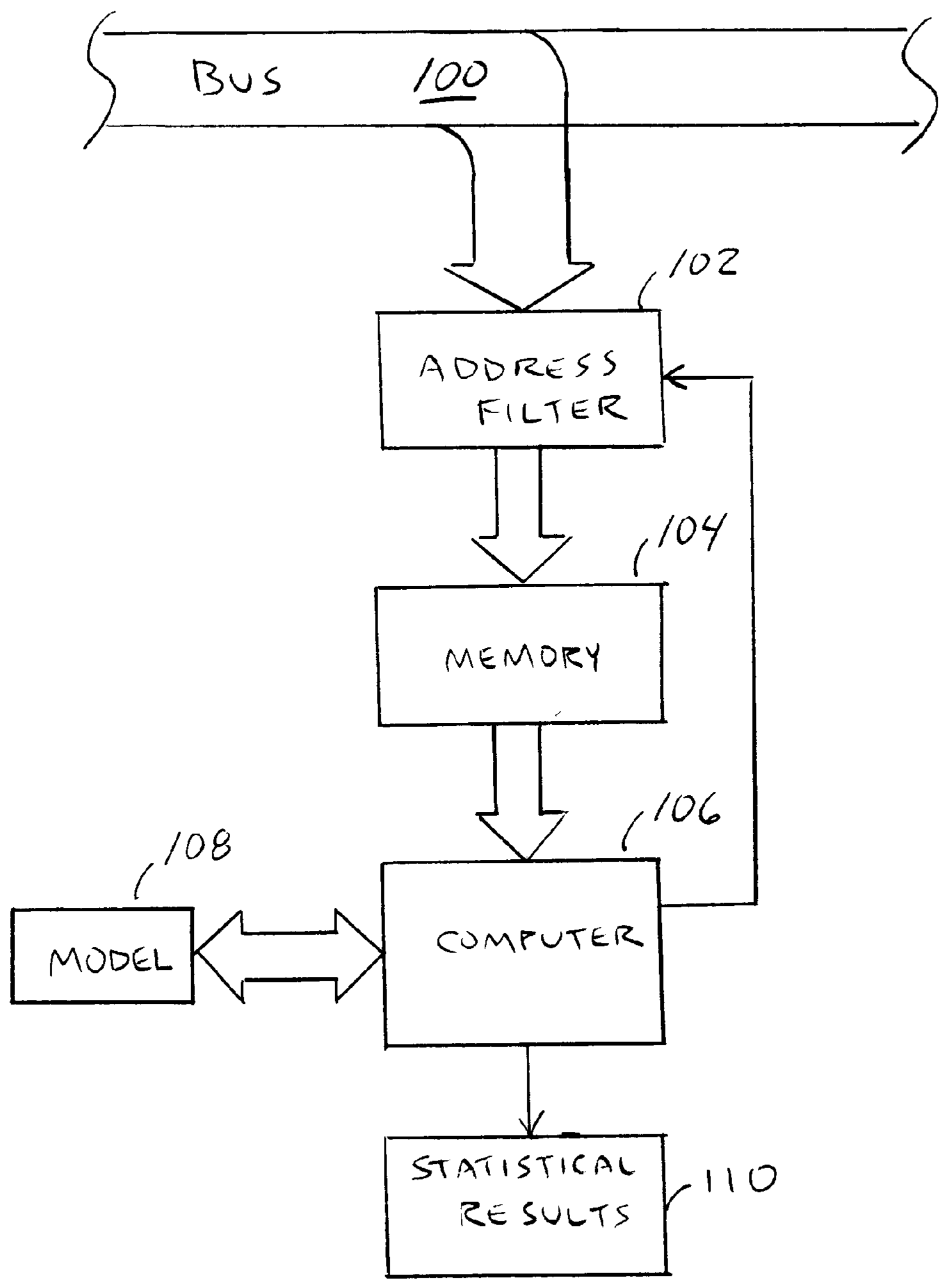
FIG. 1 is a block diagram of an example embodiment of a system in accordance with the invention.

FIG. 1 is a block diagram of a system for analyzing the effectiveness of a cache. A computer bus 100 carries memory transactions, including addresses and transaction types (for example, load, store, invalidate). An address filter 102 selects addresses according to a predetermined algorithm, and passes only selected addresses and the associated transaction data to a transaction capture memory 104. When the transaction capture memory 104 is filled, a computer 106 reads the captured memory transactions from the transaction capture memory 104. The address filter 102 is programmed to select a different set of addresses and the process is repeated. Computer 106 applies the captured transactions to a software model 108 of a cache. Based on the results of the captured transactions in the modeled cache, the computer 106 produces statistical results 110.

The computer 106 may be the computer containing bus 100, in which case the contents of the transaction capture memory 104 are processed at a later time. Alternatively, a separate computer may read the contents and run the model. If a separate computer is available, the transaction memory may be configured as a buffer, so that instead of waiting for the memory to fill, some captured transactions may be read as new transactions are being stored.

Figure 2:
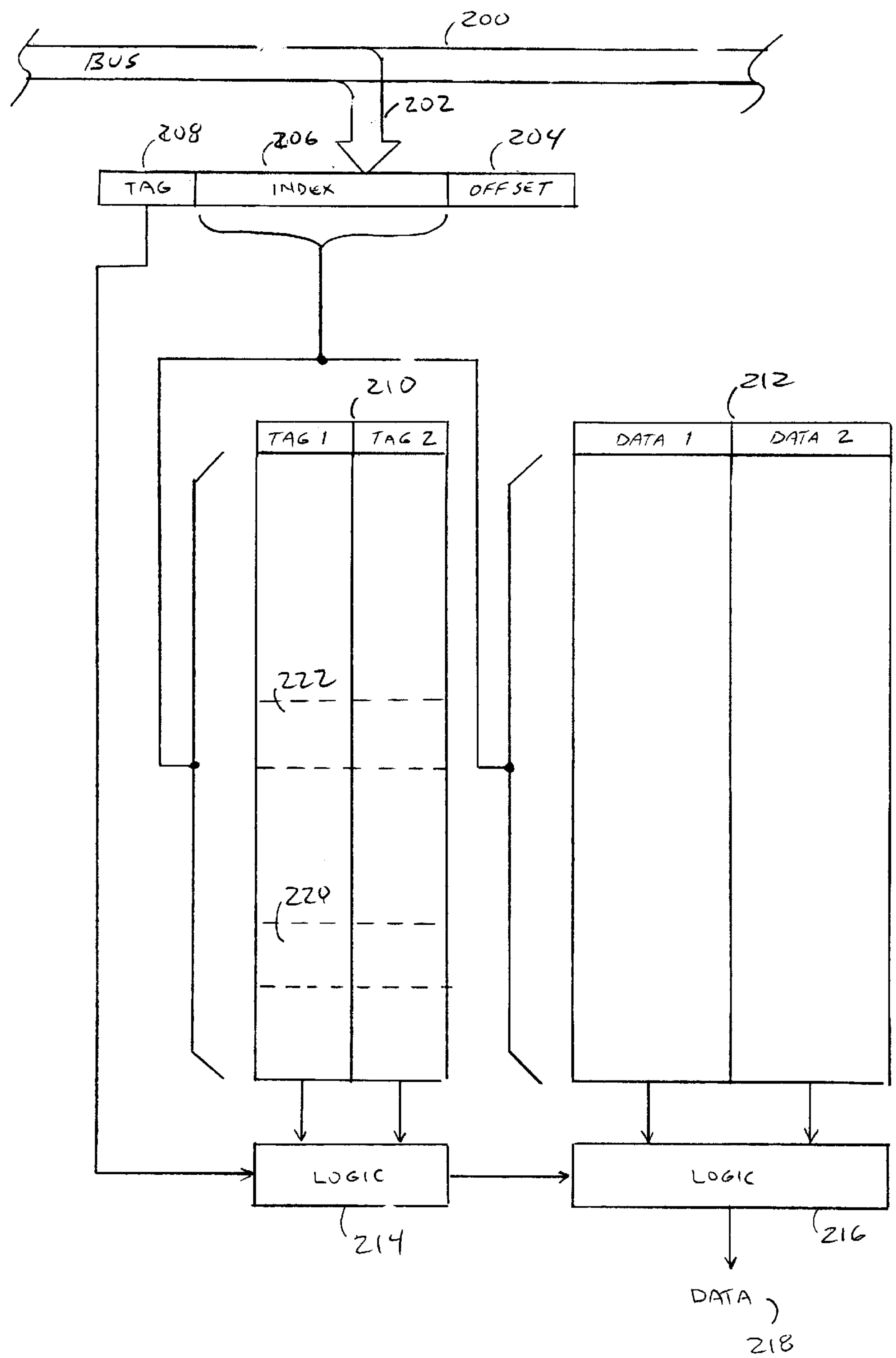
FIG. 2 is a block diagram of a model of an example cache for use by the system of FIG. 1.

FIG. 2 is an example cache structure that might be modeled (FIG. 1, 108) in software by computer 106. The cache depicted in FIG. 2 is a two-way set associative cache. A bus 200 includes addresses and data. An address 202 from the bus 200 is logically partitioned into three parts: offset bits 204 that designate the location of a byte within a line, set index bits 206 used to determine whether associated data is in a line within a selected set of lines within the cache, and tag bits 208 used to select one of two lines of data from the cache. The cache is logically divided into an address (tag) portion 210 and a data portion 212. Set index bits 206 are used to select a set of two tags (one per associativity) in the tag portion 210 and a set of two lines of data in the data portion 212. A pair of selected tags is presented to logic 214. Logic 214 compares the tags from the cache with the tag bits 208 in the address from the bus. The output of logic 214 determines which one of two lines of data from the data portion 212 is provided as a cache data output 218. If no sets in the cache have index bits corresponding to the set index bits 206 then there is a cache miss.

Address filter hardware (FIG. 1, 102) is programmed to capture a subset of the addresses. For example, for one contiguous address capture period, hardware 102 might be programmed to capture the range of addresses that map onto the area indicated by area 220 in FIG. 2 in the tag area 210 of the cache. If an address has index bits that fall into the range corresponding to area 220, the address, the transaction type (load, store, invalidate, etc.), the time, and the transaction source (which processor or I/O device) may all be stored in the transaction capture memory 104. When the transaction capture memory 104 is full, the bus monitoring hardware stops capturing transactions. The transactions in the transaction capture memory are then sequentially applied to the software model of a cache, for example a software model of a two-way set associative cache as depicted in FIG. 2. Each captured transaction is analyzed to see if a cache hit or miss occurs, and whether a cache entry is evicted. Simple statistics (FIG. 1, 110), for example, the number of references and number of misses, are computed. More complex analysis may examine evictions for locality related statistics, for example, whether entries are evicted by a series of consecutive addresses. The model may evaluate more than one cache configuration at a time. Alternatively, the model may evaluate a configuration with multiple caches, for example, the workload of one group of processors mapping to one cache and another group of processors mapping to another cache. The coherency interaction of multiple caches can be observed and statistical inferences can be drawn.

Address masks are designed so address space is partitioned along cache set boundaries. Either all addresses that can reference a set are included by a mask or no references are included (there are no partial cache sets). Note that area 220 is depicted as a contiguous area in FIG. 2 but a contiguous area is not required.

Once the transaction capture memory 104 is emptied, the address filter hardware 102 is programmed to capture a different subset of the range of addresses, for example, the range indicated by area 222 in FIG. 2. In FIG. 1 the address filter 102 is depicted as being controlled by the processor 106 but in general it may be programmed by a human, by a software program, or by a hardware state machine. Again, when the transaction capture memory 104 is full, the contents are applied to the software model of a cache.

The above process is repeated N times. After N transaction capture periods, statistics are computed for all N periods. Then, for example, based on N observations of the number of references and the frequency of misses, the hit rate for the modeled cache can be stated with confidence limits. For example, a conclusion may be made such as: "Based on 30 sample periods, the hit rate is 52% to 56% with a confidence of 90%."

Consider a specific example. A potential cache to be evaluated is a four-way set associative cache with 524,288 ($2^{19}$) sets. Such a cache would take several minutes of real time just to fill and residency times may be on the order of tens of seconds. Capturing all transactions for a time greater than the typical residency time is impractical. One can view the cache as having 1,024 groups of 512 cache sets per group (or any other convenient group size where the number of cache sets is an integral power of two). Each transaction period monitors addresses that map to one group of sets. For a four-way set associative cache, a group then comprises 512 sets, with four lines per set. Over time, the system randomly selects N (for example, 30) of the 1,024 possible groups. Each capture period may take on the order of 10 minutes to set-up, trace, and store. A trace may take from a few hundred seconds to a few thousand seconds, depending on the activity rate of the particular addresses being traced.

For the above example, consider a 32-bit address partitioned as follows:

```
     xxxx xxxx xxxx xxxx xxxx xxxx xxxx xxxx
  |      tag      |          index          | offset
```

An example mask is as follows:

xxxx xxxx xxxx xxxx xxxx 0000 0101 1xxx xxxx

Within the 19 index bits, nine mask bits are specified and the remaining bits are "don't care" (designated by "x"). Any address having a bit-for-bit match to the nine specified mask bits is captured. For each trace, nine bits within the index are selected and binary "care" values are specified. It is not necessary for the nine selected bits to be contiguous.

A multiprocessor system may be analyzed. For a multiprocessor system the transaction memory may capture which processor initiated each transaction in addition to the address and transaction type. Then, cache alternatives may be modeled, for example a large cache shared by four of eight processors versus smaller caches dedicated to fewer processors. The various models may also track traffic at interconnects to detect and model the effects of various coherency actions. For a bus-based system, the hardware may monitor all transactions on a bus. For a ring-based system or cross-bar system, the hardware may monitor a processor-to-interconnect interface or an interconnect-to-memory interface.

Figure 3:
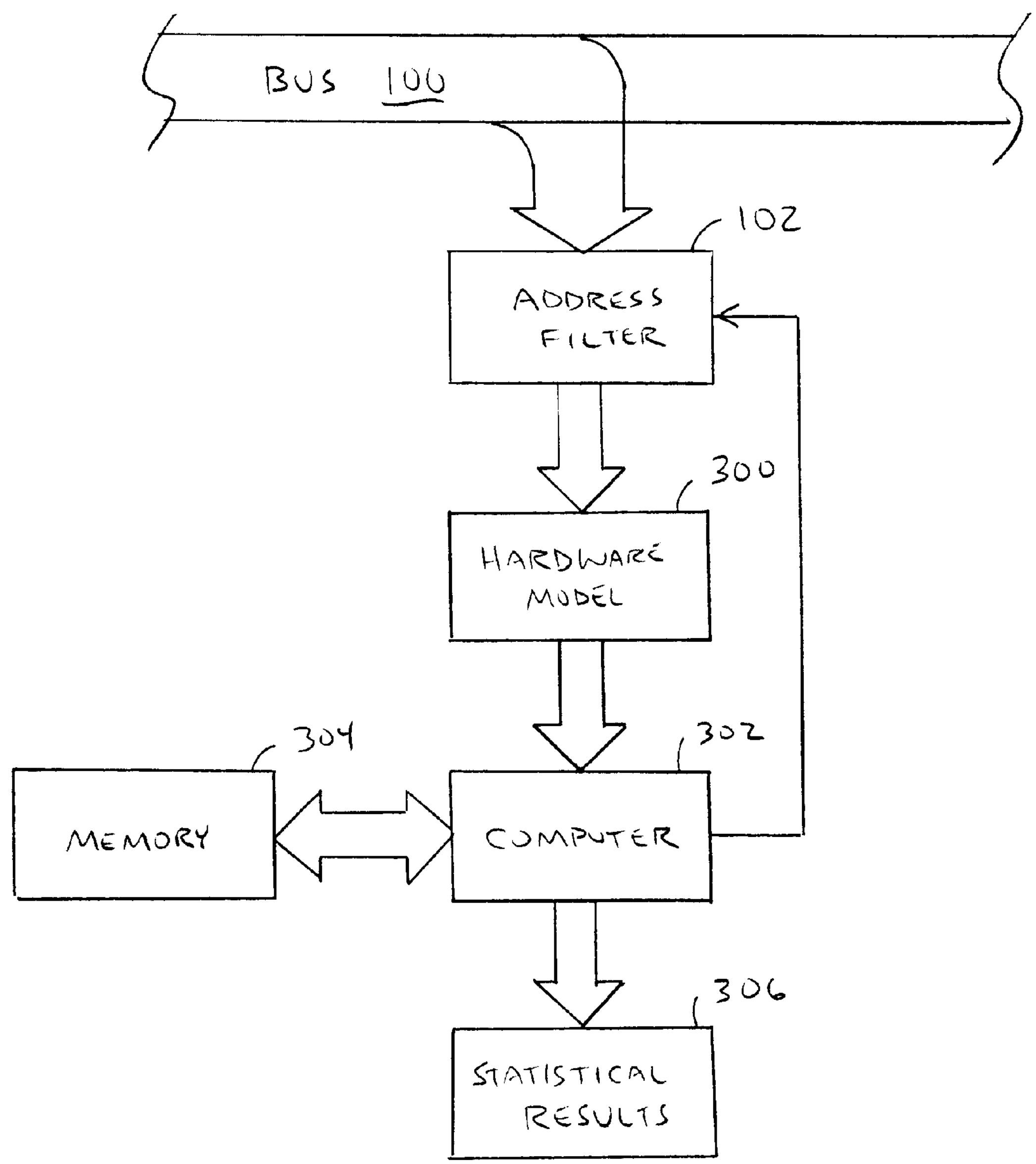
FIG. 3 is a block diagram of an alternative embodiment using a hardware model.

FIG. 3 illustrates an alternative embodiment. In FIG. 3, an address filter 102 is implemented as discussed in conjunction with FIG. 1. However, instead of capturing addresses and transactions into memory and then using a software model as in FIG. 1, the system in FIG. 3 uses a hardware model 300. For example, hardware model 300 might model one group of sets. For the example provided above, a hardware model may have 512 sets, and therefore sized to capture one trace with one address mask. During the trace, statistics generated by the hardware model 300 are periodically read by a computer 302, and appropriate statistical data is stored into memory 304. After multiple traces have been made with multiple address masks, overall statistics 306 are computed. Note that hardware model 300 might also be a single set and the experiment would then require a corresponding increased number of traces. The associativity parameters (two-way, four-way, etc.) and the position of the mask bit for a hardware cache may be programmably set.

A hardware model has some advantages over a software model. A hardware model can interact with the system being monitored. In contrast, a software model used after transactions are captured is inherently passive. In particular, for multiple levels of caches with inclusion (a cache that includes all lines contained by caches higher in the hierarchy), when an item is evicted from a lower level cache the same item must be evicted from all higher cache levels. This is done by an invalidate command generated by a cache. A hardware model can generate an invalidate command and cause lines to be evicted from higher level caches. As a result, more accurate statistics can be gathered. In contrast, with a passive software model, the impact of evictions and replacements on higher level caches may not be accurately modeled.

In FIG. 1, the address filter 102 and memory 104 may be implemented by a programmable logic analyzer. For example, the example above for capturing addresses mapping to 512 sets of a four-way set associative cache has been implemented using a Hewlett-Packard 16500 B/C logic analyzer. Each trace requires approximately 30–60 megabytes. Alternatively, equivalent logic analyzer hardware may be added to a computer. In particular, the address filter may be incorporated into a memory controller chip. Alternatively, a hardware cache model may be an option that can be added to computer hardware, may be built into hardware such as into a memory controller chip, or alternatively, into a processor. Consider, for example, a four-way set associative cache with a single set of four lines may be added to a processor. Then, analysis proceeds as discussed above, with the filter selecting references to single set for each trace, and enough traces are completed to provide meaningful statistical data. Alternatively, monitoring may be continued until all sets have been monitored to provide better accuracy.

In general, the tradeoff between the number of groups of sets observed and number of sets within a group versus statistical accuracy is a choice of the experimenter. Also, instead of random selection of groups, other sampling techniques (for example, stratified) may be used.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for analyzing the effectiveness of a computer cache, the method comprising the following steps:

(a) monitoring addresses on an interconnect;

(b) capturing, in a memory, a subset of the addresses;

(c) repeating steps (a) and (b) multiple times, where at least two of the subsets of the addresses are different;

(d) applying the captured addresses to a model of the computer cache; and (e) computing statistical cache data, for the model, for the captured addresses.

2. The method of claim 1, step (b) further comprising:

capturing only addresses that map to a group of sets of a model of a cache and not capturing addresses that map outside the group.

3. A method for analyzing the effectiveness of a computer cache, the method comprising the following steps:

(a) monitoring addresses on an interconnect;

(b) sending a subset of the addresses to a model of the computer cache, the model comprising a fraction of the computer cache;

(c) repeating steps (a) and (b) a plurality of times, where at least two of the subsets of the addresses are different;

(d) capturing, in a memory, data from the model needed to compute statistical cache data for the model; and (e) computing statistical cache data for the model.

4. The method of claim 3, further comprising:

asserting, by the model, invalidate commands onto the interconnect.

5. The method of claim 3, step (b) further comprising:

sending only addresses that map to a group of sets of the model of the computer cache and not sending addresses that map outside the group.

6. A system for analyzing the effectiveness of a computer cache, the system comprising:

a memory;

an address filter receiving addresses from an interconnect, the address filter sending a subset of the addresses to the memory, and at least one different time sending at least one different subset of the addresses to the memory;

a processor, the processor receiving the contents of the memory and applying the contents of the memory to a software model of the computer cache; and the processor computing a cache statistic of the software model as a result of the contents of the memory being applied to the software model.

7. The system of claim 6 further comprising:

the addresses sent by the address filter to the memory comprising only addresses that map to a group of sets of the software model of the computer cache and not addresses that map outside the group.

8. A system for analyzing the effectiveness of a computer cache, the system comprising:

a hardware model of the computer cache, the hardware model comprising a fraction of the computer cache;

an address filter receiving addresses from an interconnect, the address filter sending a subset of the addresses to the hardware model, and at least one different time sending at least one different subset of the addresses to the hardware model;

a memory receiving the contents of the hardware model; and a processor computing a cache statistic of the hardware model as a result of analysis of the contents of the memory.

9. The system of claim 8 further comprising:

the hardware model adapted to assert invalidate commands onto the interconnect.

10. The system of claim 8 further comprising:

the addresses sent by the address filter comprising only addresses that map to a group of sets of the hardware model of the computer cache and not addresses that map outside the group.

* * * * *